United States Patent [19]

Dominesey et al.

[11] Patent Number: 5,261,623
[45] Date of Patent: Nov. 16, 1993

[54] ANTI-CLOCKSPRINGING MECHANISM FOR A WEB ROLL CASSETTE

[75] Inventors: Andrew E. Dominesey, Rochester; Clark E. Harris, Fairport; Thomas C. Healey, Rochester; Raymond D. Hulbert, Penfield; Joel R. Shaw, Fairport, all of N.Y.

[73] Assignee: Eastman Kodak Company, Rochester, N.Y.

[21] Appl. No.: 890,890

[22] Filed: May 29, 1992

[51] Int. Cl.⁵ .............................. G03B 1/00
[52] U.S. Cl. ..................... 242/71.1; 242/55.53
[58] Field of Search ................ 242/71, 71.1, 71.7, 242/71.9, 55.53; 354/275; 206/316, 407, 409

[56] References Cited

U.S. PATENT DOCUMENTS

| | | | |
|---|---|---|---|
| 3,831,881 | 8/1974 | Tucker | 242/194 |
| 3,944,148 | 3/1976 | Freeman et al. | 242/71.1 X |
| 4,398,814 | 8/1983 | Muylle et al. | 242/71.1 X |
| 4,597,658 | 7/1986 | Buelens et al. | 354/275 |
| 4,732,271 | 3/1988 | Solyntjes | 242/71.1 X |
| 4,756,418 | 7/1988 | Johanson et al. | 206/397 |
| 4,802,633 | 2/1989 | Berry | 242/71.1 |
| 4,834,236 | 5/1989 | Buelens et al. | 242/71.1 |
| 4,903,833 | 2/1990 | Berry | 206/407 |
| 4,928,827 | 5/1990 | Hara | 242/71.1 X |
| 4,956,908 | 9/1990 | Morse et al. | 242/71.1 X |
| 5,046,677 | 9/1991 | Loewe et al. | 242/71.1 |
| 5,126,774 | 6/1992 | Loewe et al. | 242/71.1 X |
| 5,156,354 | 10/1992 | Robertson et al. | 242/71.1 |

OTHER PUBLICATIONS

Research Disclosure Nov. 1977 #16352 by Lehmann et al.

Primary Examiner—Daniel P. Stodola
Assistant Examiner—John P. Darling
Attorney, Agent, or Firm—Clyde E. Bailey

[57] ABSTRACT

A cassette for wound web material has an anti-clockspringing mechanism for securing the web against movement during storage and shipment. The roll of web material is mounted on a tubular core (12) arranged to rotate with the roll of material within the cassette (10).

The cassette (10) has a jacket (16), end caps (22), and core plugs (34) for securing the end caps (22) onto end edges (18) of the jacket cassette (10). Each of the end caps (22) has a plurality of radially extending spaced apart stop (32). The anti-clockspringing mechanism comprises an arm (56) on the core plug (34) movable between a core-blocking position in which the arm (56) extends into a space between two adjacent ribs (32) and is retained therebetween for preventing rotation of the web roll, and a core-unblocking position on which the arm (56) is disengaged from the ribs (32) for allowing web rotation.

6 Claims, 3 Drawing Sheets

ANTI-CLOCKSPRINGING MECHANISM FOR A WEB ROLL CASSETTE

FIELD OF THE INVENTION

The present invention relates generally to web cassettes, and more specifically to an anti-clockspringing of the wound roll of web material within the cassette.

BACKGROUND OF THE INVENTION

In various cassettes now in use for webs of photosensitive film and paper, the web is wound on a spool or core, with or without flanges, and is disposed within a cassette which totally surrounds the web and protects it from light and other damaging effects. One end of the web is normally secured to the core or spool center, and the other end extends out of the cassette through an exit slot therein. The other end of the web is fastened to the surface of the cassette, and is released therefrom for insertion into a camera or the like. It has been found that there is a tendency for the web in such cassettes to unwind during handling and shipping. Inasmuch as the inner end of the web is connected to the core or the spool center, and the other end is normally secured to the outer surface of the cassette, the web acts as a released clockspring, turning the spool as it unwinds. Such web clockspringing can result in scratching of the surface of adjacent web convolutions, causing a deterioration in the quality of the image that may be recorded thereon. In other instances the web can clockspring outwardly to the extent that the outer convolution of web jams against the inner surface of the cassette, making subsequent unreeling of the web difficult or impossible. In those situations in which the outer end of the web is not fastened to the surface of the cassette or is inadvertently released from the cassette surface, the clockspringing can cause the outer end of the web to be pulled back through the slot into the cassette, resulting in a cartridge that is completely unusable.

Various attempts have been made to provide anti-clockspringing apparatus to prevent unwinding of the web in cassettes. For example, a core locking device for a web dispensing cassette is disclosed and published as Item No. 16352 in the Nov. 1977 issue of Research Disclosure. In this core-locking apparatus, the web winding core is provided with a slotted end, and a core-locking member is provided that is captive and slidable in one of the two end caps of the cassette. In U.S. Pat. No. 3,831,881, an anti-backup device is disclosed comprising a fork-like member located within a hollow core on a rotatable film take-up core. The control member has flexible outwardly extending arms projecting from a body portion. In an engaged position of the control member, the arms thereof slide over internal cam or ratchet surfaces of the take-up core during rotation of the core in the forward (take-up) direction, and hence permits such rotation. On the other hand, these arms engage the cam or ratchet surfaces of the core post to block rotation of the core when an attempt is made to rotate the core in the reverse (unwinding) direction. When the film cartridge is placed within a camera, the fork-like member can be moved axially until it is out of engagement with the camera ratchet surfaces, thereby permitting free rotation of the core in both the forward and reverse directions. In U.S. Pat. No. 4,756,418, an anti-clockspringing apparatus is disclosed comprising a clip separate from the core and cassette, having opposite ends thereof insertable through aligned notches and slots in the core and cassette respectively, for locking the core to the cassette.

Therefore a persistent need exists for a web cassette having an improved anti-clockspring mechanism for preventing unwinding of the web in the cassette thereby reducing incidences of damaged cartridges.

SUMMARY OF THE INVENTION

It is, therefore, an object of the present invention to provide an anti-clockspringing device for a web cassette that is of simple design and construction, thoroughly efficient and reliable in operation, and economical to manufacture. Accordingly, for accomplishing these and other objects of the invention, there is provided an anti-clockspringing device for a web cassette comprising: a means for receiving a web material onto which a roll of web material is wound to form a web roll, the receiving means having an inner peripheral surface defining an axial core opening; a means for surrounding the web roll, the surrounding means having end edges and an axially extending web exit slot; a pair of end portions having outer walls defining peripheral recesses for receiving the surrounding means end edges in light-tight relation, the end portions further having central openings in substantial alignment with the axial core opening, and stop means extending radially outwardly from the central openings to the outer wall for interacting with an anti-clockspringing means; a means for plugging each end portion, each plugging means having a head portion and a body portion of a slightly larger diameter than the diameter of the axial core opening, whereby when the plugging means body portion is pressed through the end portion central opening into the axial core opening to an assembled position, the plugging means is rigidly secured to the web roll for rotation therewith, and the end portion are secured by the plugging means head portion to the surrounding means end edges in light-tight relation; and anti-clockspringing means on the cassette for securing the web core against rotation within the cassette during shipping and handling, and for releasing the web roll for rotation in a forward direction during web transport from the cassette, the anti-clockspringing means comprising an arm on the plugging means head portion movable between a core-blocking position in which the arm extends into the space between two of the adjacent stop means, and is engageable with one of the stop means and outer walls for preventing rotation of the web roll, and a core-unblocking position in which the arm is disengaged from the stop means and outer wall for allowing web roll rotation.

BRIEF DESCRIPTION OF THE DRAWINGS

In the detailed description of the invention presented below, reference is made to the accompanying drawings, in which.

DETAILED DESCRIPTION OF THE INVENTION

Figure 1:
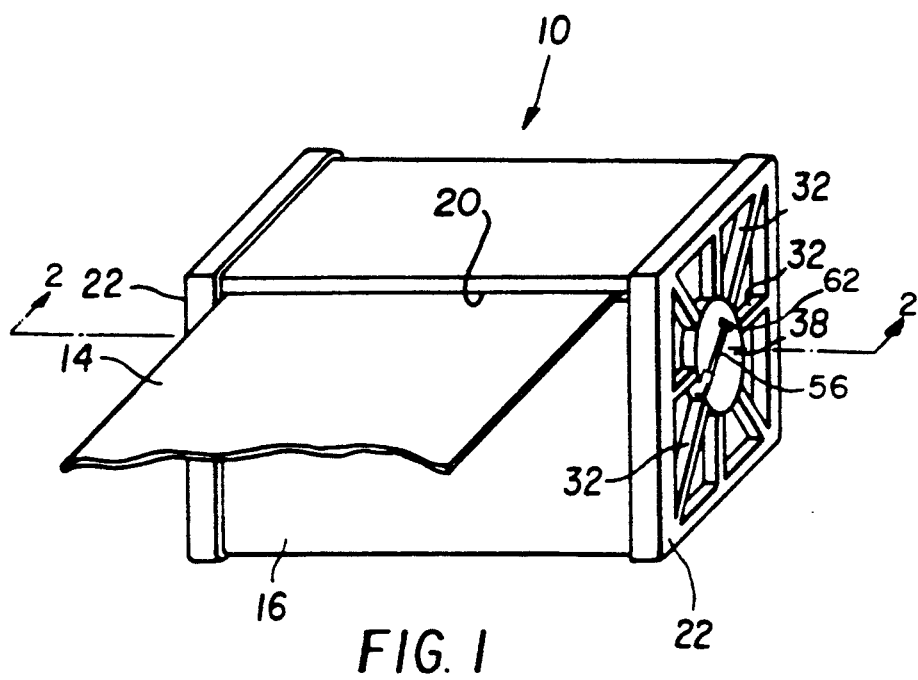
FIG. 1 is a perspective view of a web cassette in which a preferred embodiment of the anti-clockspringing device of this invention is embodied.
Figure 2:
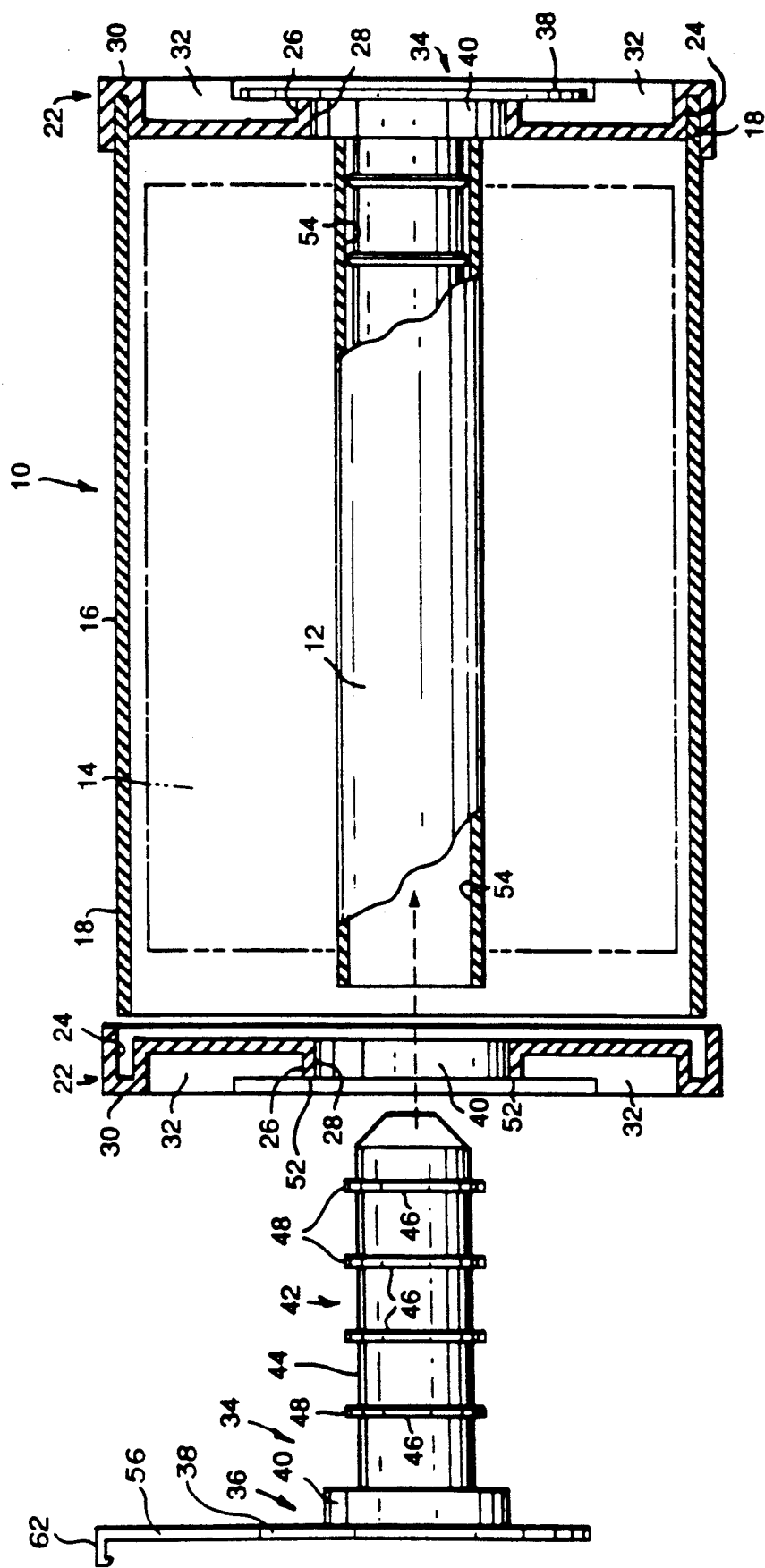
FIG. 2 is a vertical section view according to the plane indicated by the line 2—2 of FIG. 1, and further showing one end portion of the cassette exploded.

With reference to FIGS. 1 and 2, a preferred embodiment of a web cassette 10 of this invention comprises a tubular core 12, onto which is wound a web 14 of photosensitive material to form a web roll. Those skilled in the art will appreciate that just about any means of receiving a web material within the requirements of the invention can be used. The web roll is surrounded by any means within the requirements of the invention; preferably, the web roll is housed within a rectanguloid jacket 16 having end edges 18. The jacket 16 has a peripheral web exit slot 20 extending substantially from one end edge thereof to the other, through which the web may be drawn from the cassette.

The web cassette 10 is provided with a pair of identical end portions 22, each having a peripheral recess 24 for receiving an end edge 18 of the jacket 16, as best seen in FIG. 2. Each of the end portions 22 has an inner cylindrical wall 26 defining a center opening 28, a peripheral bifurcated outer wall 30 defining the recess 24 adjacent one end of the wall, and a plurality of stop means or strengthening ribs 32 radially extending from the inner wall 26 to the outer wall 30.

A pair of identical core plugs 34 are provided for securing the end caps 22 onto the end edges 18 of the jacket 16. Each of the core plugs 34 has a head portion 36 having an outer circular disk 38 and an inner cylindrical bearing 40 adapted to nest within the center opening 28 of the inner wall 26. Each core plug 34 further has a body portion 42 comprising a rigid cylindrical part 44 provided with a plurality of axially spaced slots 46. Each body portion 44 further has a plurality of flexible parts comprising annular rings 48 which nest within the peripheral slots 46. The inner diameter of each ring 48 is smaller than the outer diameter of the rigid cylindrical part 44, to provide an interference fit between the inner periphery of the ring 48 and the peripheral slot 46. Each slot is further provided with bevelled edges, not shown, to allow flexing of the ring 48 when the core plug 34 is inserted through the inner bearing wall 26 of the end cap 22 into the core opening. When the core plug 34 is fully inserted into its assembled position, as seen on one end in FIG. 2, the cylindrical core plug bearing 40 is journaled within the inner bearing wall 26 of the end cap 22. Also, the circular disk surface 38 bears against the end surface 52 of the inner bearing wall and ribbed surfaces 32 to force the end cap recesses 24 and jacket side edges 18 into a light-locked mating engagement, and to provide a light lock to prevent light from passing between the mating surfaces of the journal 40 and inner bearing wall 26 into the web cassette 10.

Also in this assembled position, the flexed annular rings 48 are deformed conically into frictional engagement with the inner peripheral surface 54 of the core 12 to prevent withdrawal of the core plug 34 from its assembled position. This assures the securement of the end caps 22 on to the side edges 18 of the jacket 16 in light-tight relation without the necessity for adhesive and/or staples. Alternatively, the annular rings 48 can be molded as part of the plug body portion 42 to achieve substantially the same result. As the web 14 is withdrawn from the web cassette 10, the web roll and core 12 are rotated along with the core plugs 34. Advantages of the core plugs rotating along with the core and web roll are to clearly indicate to the operator that web is being transported and to provide rewinding capability.

Figure 3:
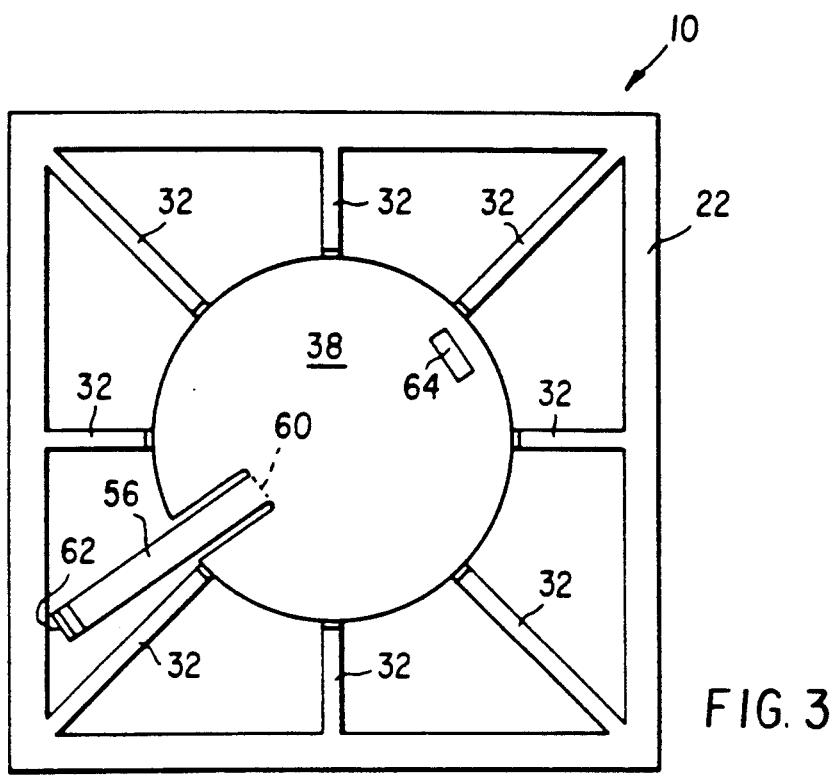
FIG. 3 is an end view of the web cassette showing the anti-clockspringing device in a core-blocking position.
Figure 4:
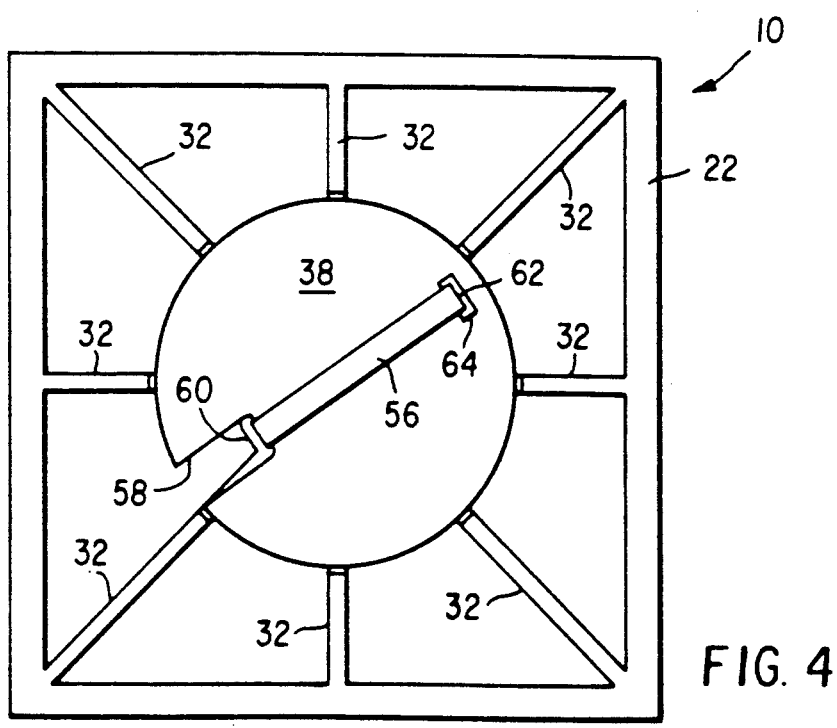
FIG. 4 is an end view similar to FIG. 3 showing the anti-clockspringing device in the core-unblocking position.

With reference to FIGS. 3 and 4, the web cassette 10 is further provided with an anti-clockspringing means for securing the web core 12 against rotation within the cassette during shipping and handling, and for releasing the web roll for rotation in a forward direction during web transport from the cassette. The anti-clockspringing means comprises an arm 56 having one end thereof extending from a peripheral surface of a slot 58 in the core plug head 38 and connected to the peripheral surface of the head by a flexible hinge 60. The opposite end of the arm 56 is provided with a laterally extending tab 62. When the arm is extended radially outwardly into the space between a pair of ribs 32 on the end cap (FIG. 3), the anti-clockspringing device is in its core-blocking position. In this position, the arm 56 is confined between a rib 32 and outer wall 30 to block rotation of the core plug 34 and web roll. When it is desired to withdraw the web 14 from the cassette 10, the arm 56 is pivoted about the hinge 60 to a core-unblocking position, in which the tab 62 is moved into engagement with a recess 64 in the core plug circular disk, as best seen in FIG. 4. In this position, the arm 56 is withdrawn from the space between the ribs 32 and outer wall 30, and the core plugs 34 and web roll are free to rotate. Those skilled in the art will appreciate that other arrangements of the anti-clockspringing means are within the comtemplation of the invention, for instance the arm 56 may be hingeably mounted to the end portion 22 and the stop means or ribs 32 arranged on the core plug head 38.

Accordingly, an important advantage of the anti-clockspringing device of the present invention is that it is of simple design and construction, thoroughly efficient and reliable in operation, and economical to manufacture.

The invention has been described in detail with particular reference to a preferred embodiment thereof, but it will be understood that variations and modifications can be effected within the spirit and scope of the invention.

What we claim is:

1. A light-tight cassette for holding and dispensing a roll of photosensitive web material, said cassette comprising:
   a) means for receiving a roll of web material wound thereon to form a web roll, said receiving means having an inner peripheral surface defining an axial core opening;
   b) means for surrounding the web roll, said surrounding means having end edges and a peripheral web exit slot;
   c) a pair of end portions having an outer wall defining peripheral recesses for receiving the end edges of said surrounding means in light-tight relation, the end portions further having central openings in substantial alignment with the axial core opening, and stop means extending radially outwardly from the central openings to the outer wall;
   d) means for plugging each end portion, each plugging means having a head portion and a body portion, whereby when the plugging means body portion is pressed through the end portion central opening into the axial core opening to an assembled position, the plugging means is rigidly secured to the web roll for rotation therewith, and the end portions are rigidly secured by the head portion to the surrounding means end edges in light-tight relation; and e) anti-clockspringing means on the cassette for securing the web core against rotation within the cassette during shipping and handling, and for releasing the web roll for rotation in a forward direction during web transport from the cassette, the anti-clockspringing means comprising an arm on the head portion of the plugging means, the arm being connected to the periphery of the head portion by a flexible hinge, and wherein the head portion is movable between a core-blocking position in which the arm extends into the space between two adjacent ribs, and is engageable with one of the adjacent ribs and outer wall for preventing rotation of the web roll, and a core-unblocking position in which the arm is disengaged from the ribs and outer wall for allowing web roll rotation.

2. A light tight cassette recited in claim 1 wherein the head portion has a recess, and wherein a tab is provided on the other end of the arm for releasably engaging the recess for holding the arm in the core-unblocking position.

3. A light-tight cassette recited in claim 2 wherein the head portion has a radially extending peripheral slot and the one end of the arm is connected to a peripheral surface of the slot by the flexible hinge, and the tab extends laterally from the other end of the arm.

4. A light-tight cassette for holding and dispensing a roll of photosensitive web material, said cassette comprising:

a) a tubular core onto which a roll of web material is wound to form a web roll, the core having an inner peripheral surface defining an axial core opening;

b) a jacket encircling the web roll, the jacket having end edges and a peripheral web exit slot;

c) a pair of end caps having an outer wall defining peripheral recesses for receiving the jacket end edges in light-tight relation, the end caps further having central openings in substantial alignment with the axial core opening, and stop means extending radially outwardly from the central openings to the outer wall;

d) a core plug for each end cap, each core plug having a head portion and a body portion of a slightly larger diameter than the diameter of the axial core opening, whereby when the core plug body portion is pressed through the end cap central opening into the axial core opening to an assembled position, the core plug is rigidly secured to the web roll for rotation therewith, and the end caps are rigidly secured by the head portion to the jacket side edges in light-tight relation; and e) anti-clockspringing means on the cassette for securing the web core against rotation within the cassette during shipping and handling, and for releasing the web roll for rotation in a forward direction during web transport from the cassette, the anti-clockspringing means comprising an arm on the head portion of the plugging means, the arm being connected to the periphery of the head portion by a flexible hinge, and wherein the head portion is movable between a core-blocking position in which the arm extends into the space between two adjacent ribs, and is engageable with one of the adjacent ribs and outer wall for preventing rotation of the web roll, and a core-unblocking position in which the arm is disengaged from the ribs and outer wall for allowing web roll rotation.

5. A light-tight cassette recited in claim 4 wherein the head portion has a recess, and wherein one end of the arm is connected to the periphery of the head portion by a flexible hinge, and a tab is provided on the other end of the arm for releasably engaging the recess for holding the arm in the core-unblocking position.

6. A light-tight cassette recited in claim 5 wherein the head portion has a radially extending peripheral slot and the one end of the arm is connected to a peripheral surface of the slot by the flexible hinge, and the tab extends laterally from the other end of the arm.

* * * * *